Nov. 29, 1966 R. HARMSTORF 3,287,922

METHOD AND DEVICE FOR EMBEDDING A LINE, A CABLE OR THE LIKE UNDERGROUND

Filed Feb. 28, 1962 4 Sheets-Sheet 1

INVENTOR.

Rudolf Harmstorf

BY Beaman & Beaman attys

INVENTOR.
Rudolf Harmstorf
BY
Beaman & Beaman
attys

INVENTOR.
Rudolf Harmstorf
BY
Beaman & Beaman
attys

INVENTOR.
Rudolf Harmstorf
BY
Beaman & Beaman
attys 3,287,922

METHOD AND DEVICE FOR EMBEDDING A LINE, A CABLE OR THE LIKE UNDERGROUND

Rudolf Harmstorf, Schillerstr. 45, Hamburg-Altona, Germany

Filed Feb. 28, 1962, Ser. No. 176,217
Claims priority, application Germany, Mar. 4, 1961, H 41,919
7 Claims. (Cl. 61—72.6)

Figure 1:
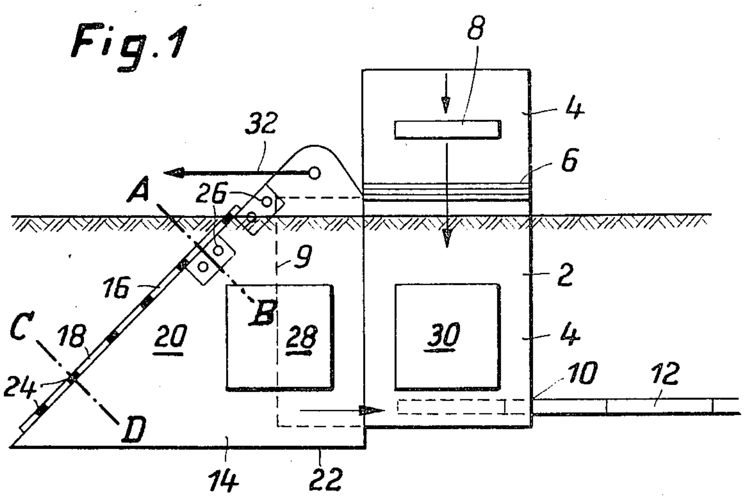

The invention relates to a method and device for embedding a cable or the like underground or into the beds of waterways wherein a channel is formed with the aid of a tool inserted into the soil down to a depth corresponding to the depth in which the cable or the like is to be embedded, by moving said tool along the path of laying the cable, said channel corresponding to the width of the tool, with the line, cable or the like being simultaneously laid on the bottom of the channel.

The classic method of laying lines, cables, or the like, underground or into the beds of waterways requires that a channel be excavated along the cable-laying path which is filled again after the line has been laid. When applying this method in rivers or other waterways, one is forced to use the various known excavator types, such as grab excavators, suction dredges or the like.

But this method has several considerable disadvantages. On the one hand, the channel dug into the bed of a river or the like is continuously refilled by the current during working on the soil under water before the laying operation may be started. Furthermore, when hard soils are involved, the use of special apparatus is often required and under certain circumstances the soil will even have to be pretreated. On the other hand, very flat slopings will occur in connection with soft soils which will have a detrimental influence on the compactness of the channel when refilled, to say nothing of the excessive amounts of soil to be moved. Finally, the embedded lines may be subjected to unfavorable loads and perhaps distortions owing to the fact that, during the embedding operation into the channel, inaccuracies may easily occur and a support is often effected only in certain points.

The described drawbacks are eliminated practically completely by the known method which is characterized in short in the first paragraph of the specification and by which the line or the cable to be embedded is washed into the soil or the beds of a waterway, respectively. In this method, an upright column-like tool is inserted with its foot end into the soil and is drawn along the predetermined cable-laying path, thereby forming a ditch in the ground along the path of the tool. Principally, the tool has its interior subdivided into at least two vertically extending cavities, one of which, i.e. that one lying in front in the direction of movement, contains a fluid, generally water, under a high pressure, while the rear cavity accommodates the line to be laid and feeds it into the ditch. At the front of the foot end of the tool extending within the soil several nozzles are provided through which water is forced which washes away the material in front of the tool. The cable or line guide duct arranged in the rear part extends at the beginning vertically downwardly from the top and then turns rearwardly within a radius corresponding to the material and diameter of the line to be laid so that it is approximately parallel with the bottom surface of the ditch.

The feed of the tool is obtained via a traction rope which engages the tool a short distance above its foot end moving within the soil, and extends up to a suitable fixed point, for instance, the other river bank. However, in general, the traction rope is guided around a deviating roller at the opposite river bank and guided back to the cable-laying boat when cables are laid into river beds. In this case the cable winch which effects advance of the tool by winding up the traction rope is provided on the boat. The tool is still guided either directly by the boat or from a special sliding carriage guided along the soil or bed.

Although this method has been applied with considerable success and is still being used on a large scale, clear limits have arisen in the course of time with respect to the application of this method. First, it was found that this known process is adapted only for washing in flexible conduits. Thereby, to start with, the diameter in case of flexible lines is limited to a certain maximum diameter. Lines having a diameter in excess of sufficient flexibility not adapted to be laid in accordance with the known method also for another reason: The greater the diameter of a flexible line, the greater will have to be the selected width of the tool, whereby the frictional forces opposing the movement of the tool in the soil will again increase to such an extent that they cannot be overcome by the known method. Furthermore, an increased diameter of the line also requires an increasesd bending radius of the cable guide duct by which the outside surfaces of the tool part to be moved through the soil are still increased, thus correspondingly increasing the friction. In short, it has been found that the known method is applicable only with tools having a soil-digging foot of a maximum width of about 0.2 m. and a maximum length of about 2 m., while the diameter of the cable to be laid is not to exceed 180 mm. A prerequisite for using this method of cable laying is that the soil must be easily washable, containing mainly sand, clay, and mud.

This clearly shows that the known process is no longer sufficient to solve problems to be dealt with nowadays. The problem today is how to lay potable water lines over long distances, for instance, to isles. There is a great pressure drop in such lines and therefore, they must be designed for relatively high working pressures. This calls for greater wall thicknesses and thus larger diameters, the result of which is that these pipes are capable of being bent only with difficulty or not at all. Also, the laying of pipelines must be considered for which steel pipes in rigid lengths must be employed. Pipes of this kind call for greater width of the tool which results in a considerable increases of the soil resistance and shell friction, especially, when coarse soils such as river gravel or coarse grit are involved. In all these cases, the known washing method is not sufficient to overcome the friction generated and to displace the soil in front of the tool.

Consequently, the present invention is based on the problem to overcome the drawbacks of the known method and to provide a method and devices for practicing said method, by means of which greater frictional forces may be overcome and the displacement of the soil may be accomplished more easily.

The invention solves this problem by a method in accordance with which the soil, at least ahead of the laying device, is subjected to the action of a vibrating surface of said device thereby displacing the soil and simultaneously moving said laying device along the desired direction of the ditch and feeding out the line, cable, or the like, into said ditch while said laying device is advanced. In the operation of the tool the point is both to decrease or abolish the outside friction of the soil effective on the tool and to remove the soil in front of the tool out of its way in order to be able to advance the tool. Now, it has been found that by the generation of vibrations in connection with the traction force exerted on the tool via the traction cable on the one hand, a much greater outside friction may be overcome and, simultaneously, the transport of material to the rear of tool may easily be effected.

It is of special advantage to give consideration to the suitable arrangement of the structural parts which are destined to perform vibrations, and give the vibratory movement a certain direction which may under certain circumstances also cover vibrations moving in a path, i.e., a circular path.

For carrying out the process, devices of most different types may be built which are characterized in that the device is equipped with at least one vibration generator.

Generally, it will have to be taken into consideration that the material to be laid must be protected from high frequency vibration. These vibrations would in most cases have adverse influences on the molecular structure of the lines or pipes, respectively, and would reduce their strength and thus the safety of the line. Therefore, in accordance with another feature of the invention, the structural parts serving to guide the material to be laid are separated from the structural parts destined to perform the vibrations by means of vibration absorbing elements.

Preferably, the devices for carrying out the process in accordance with the invention are composed of a non-vibrating main body supporting structural parts adapted to vibrate on vibration dampening elements. Preferably, the arrangement will be such that the main body also contains the main mass of the device and that the guiding means for laying the cables or lines, respectively, are accommodated therein. The structural parts adapted to vibrate are in an advantageous manner provided on both the front side of the main body and the side walls thereof.

The arrangement of the vibration generator principally depends on the size of the tool. In case of bigger devices, it will be possible or even advantageous, to provide the vibration generator within that portion of the device engaging the soil. Owing to such an arrangement, on the one hand, the effect of the generator is not reduced by long transmission paths and, on the other hand, it is possible to generate oriented vibrations, stress however being laid to the fact that the effect of the process according to the invention is not principally dependent on the generation of such oriented vibrations.

With smaller devices, the vibration generators are arranged outside the foot of the device, i.e., preferably at the upper protruding end of the structural part which is adapted to vibrate. In general, in this case, it will only be possible to generate vertically oriented vibrations. In accordance with another feature of the invention, however, the vibrating structural member is arranged on the main body with the aid of vibration damping devices so that at least a partial deflection of the generated vertically directed vibrations into a horizontal direction will occur. With this kind of vibration deflection it must still be taken into consideration that vibrations of reaction are transferred, i.e. especially when the vibrating structural member represents a great mass in proportion to the main body. As soon as a danger results from these vibrations of reaction with respect to the lines guided or supported in the main body, the guiding means must be supported with the aid of special vibrations-absorbing elements.

The special advantage of the process in accordance with the invention resides in the fact that the vibrations considerably improve the operative efficiency of the device with respect to both the reduction of friction and the displacement of the soil. The devices for embedding a cable or line may now be built considerably broader and bigger and, in addition, an embedding in heavier soils which resisted the conventional washing process, is possible.

The invention offers the possibility that also lines having a larger diameter than formerly may be laid in that the dimensions of the device are correspondingly enlarged. For the same reason, it is now also possible to lay pipes having a considerably reduced ductility owing to the increased wall gauge by correspondingly enlarging the bending radius of the guide channel for the line. The vibrating members attached to the device for carrying out the process in accordance with the invention are capable of overcoming the increasing frictional force.

As a special advantage, it is still to be mentioned that now the laying of rigid pipes of a certain predetermined length is possible. For this purpose, in accordance with another feature of the invention, the main body is designed as a nonvibrating column like structural member with a substantially rectangular cross section in which the rigid pipes to be laid are arranged super-imposed one on the other. In particular, this main body is provided at the lower end of the rear side thereof with a discharge opening through which the pipes are discharged in end-to-end relationship.

The efficiency of the process in accordance with the invention is still increased in particular by the fact that it is combined with the prior known washing process. With this, another extraordinary broadening of the field of application is possible. The combination of both processes is obtained in accordance with the invention in that a fluid channel is provided in a manner known per se in the main body which opens to the outside over several nozzles and that the vibrating structural member arranged in front of the main body is provided with apertures aligned with the direction of the nozzle rays. In this arrangement the effect of the vibrations exerted by a vibrating structural member on the soil immediately disposed in front of the device is exploited in a particularly advantageous manner and the known successful washing effect of the highly pressurized water is utilized.

Figures 2, 2A:
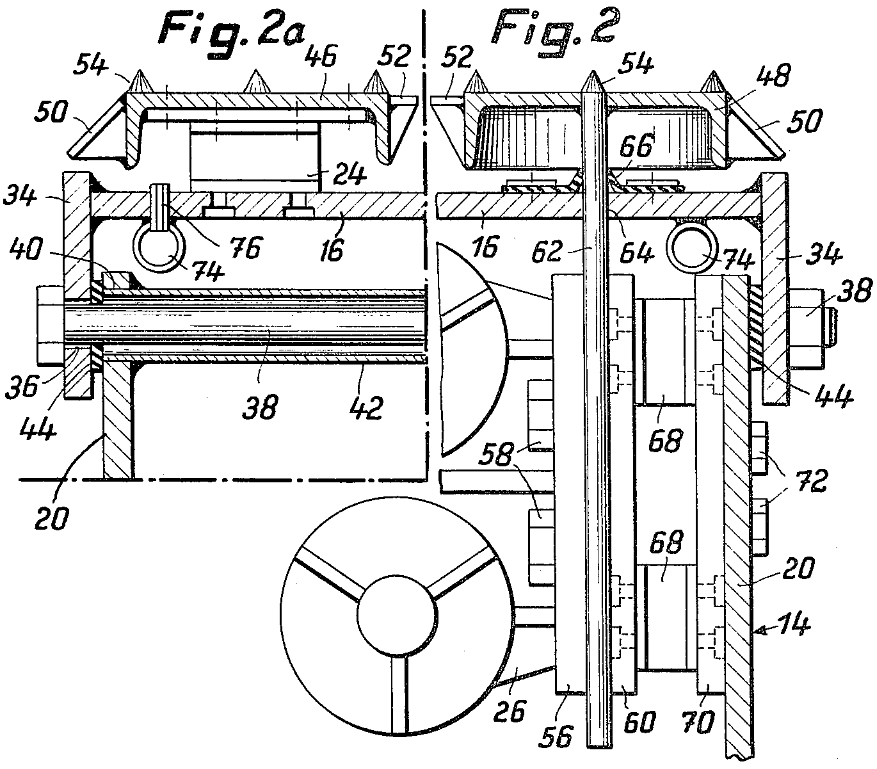
Figure 3:
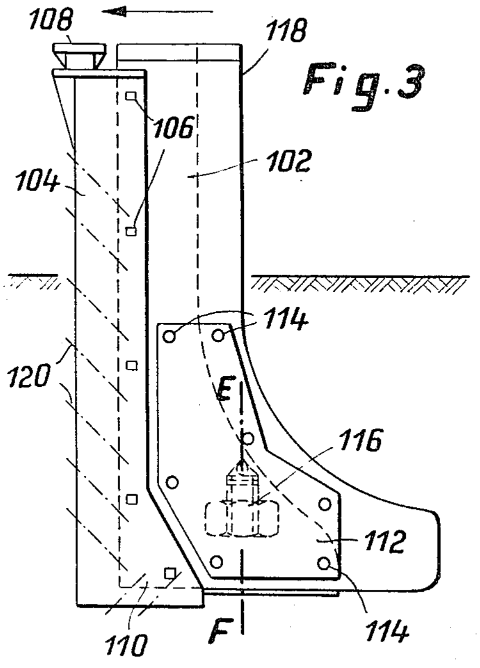
Figure 8:
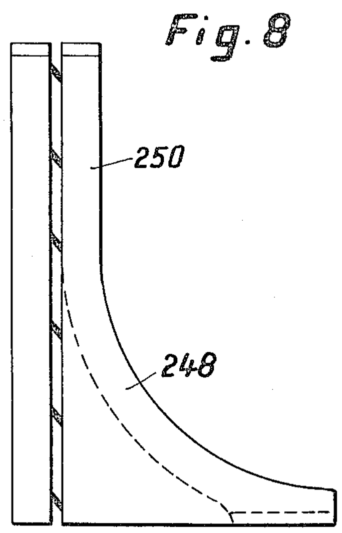
Figure 6:
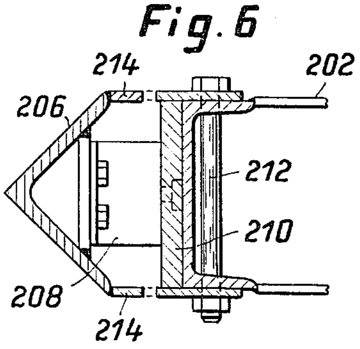
Figure 9:
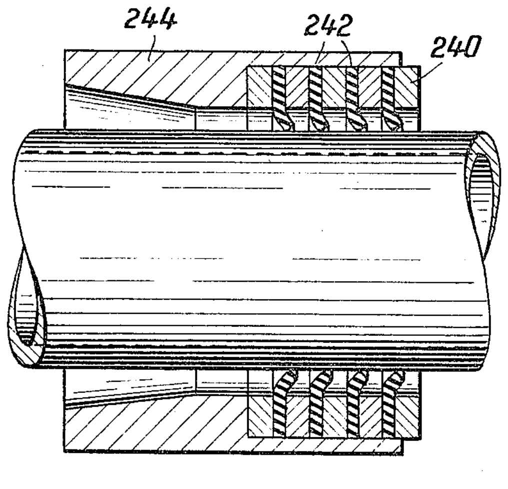
Figure 7:
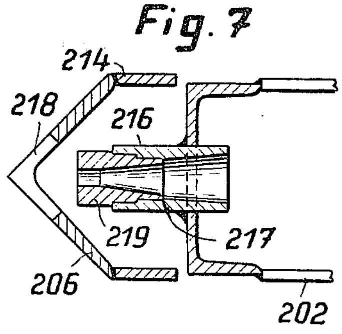
Figures 4, 5:
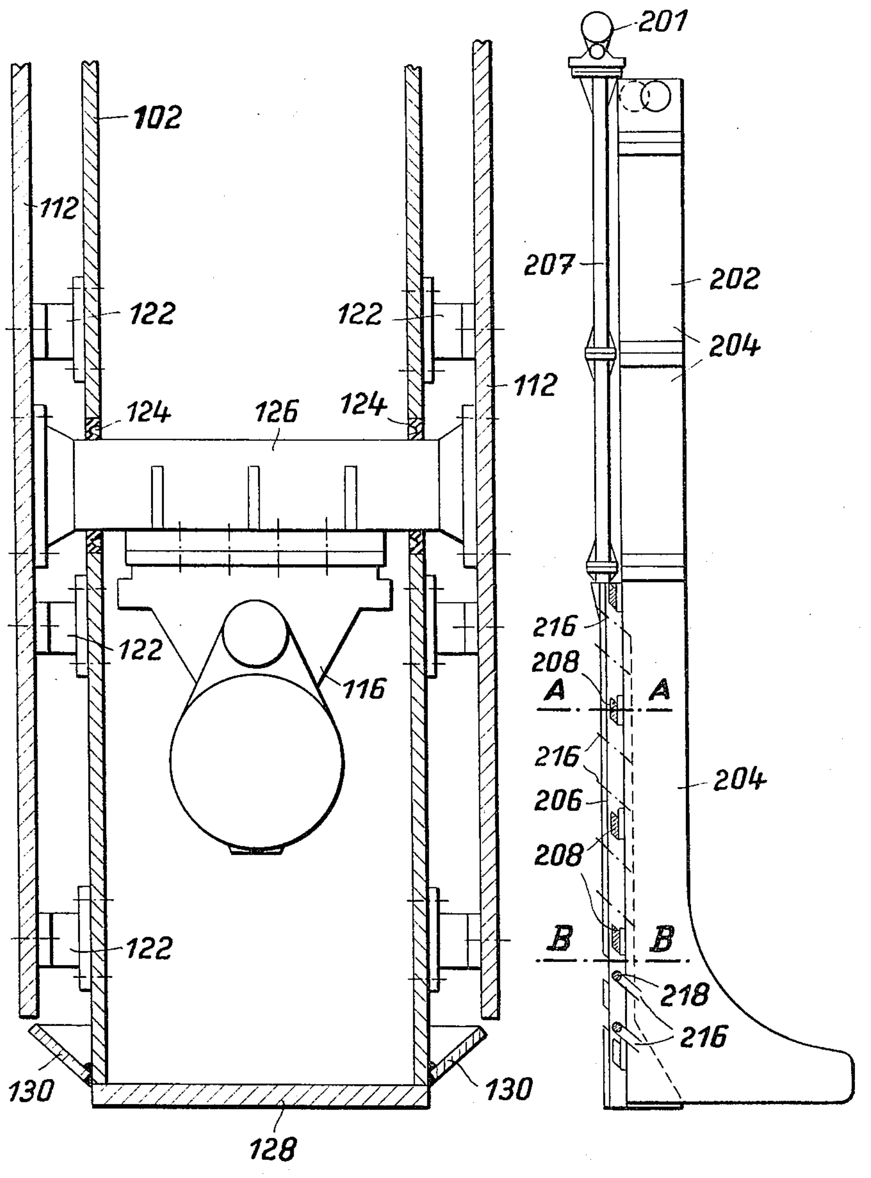
Figure 10:
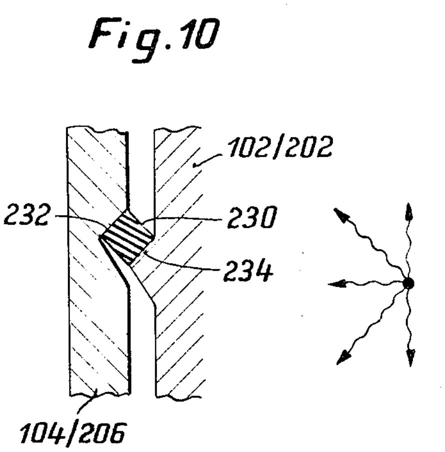
Figure 11:
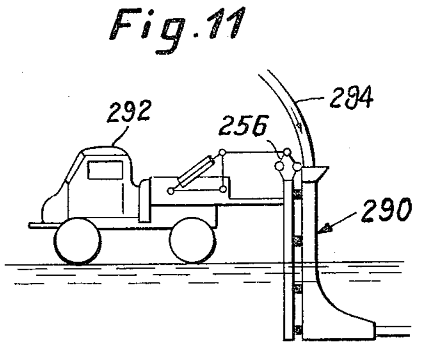
Figures 12, 13, 13A, 14:
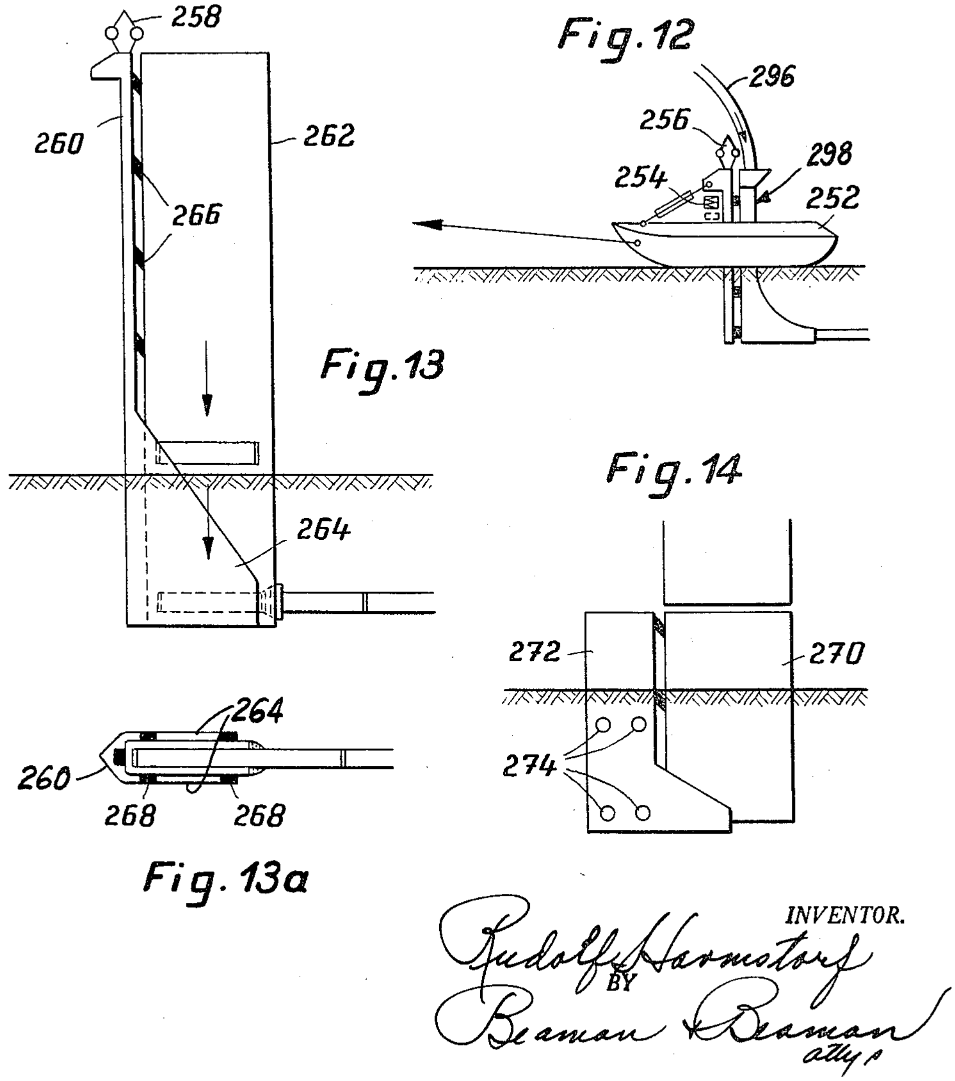

Further advantages and features of the present invention will become apparent from the following description in connection with the accompanying drawings:

In the drawings,

FIG. 1 is a schematic view of a device for carrying out the process in accordance with the invention, FIG. 2 is a partial section taken along section A–B of FIG. 1 and FIG. 2*a* is a partial section taken along C–D of FIG. 1, FIG. 3 is a schematic view of another embodiment of the device for carrying out the process in accordance with the invention, FIG. 4 is a section E–F through FIG. 3, FIG. 5 is another device for carrying out the process in accordance with the invention, FIG. 6 is a sectional view taken on line A—A of FIG. 5, FIG. 7 is a sectional view taken on line B—B of FIG. 5, FIG. 8 is a schematic side view of another device in accordance with the invention, FIG. 9 is a longitudinal sectional view through the seal to close the opening of the line passage delivering the line to be laid, FIG. 10 is a schematic view of the arrangement of a deviation element, FIGS. 11 and 12 are schematic illustrations of different carriers applying the process in accordance with the invention, FIGS. 13 and 13*a* are schematic illustrations of a device in accordance with the invention for laying rigid pipes and FIG. 14 is a schematic illustration of a device in accordance with the invention including the vibration generators arranged within that portion lying in the soil.

Considering FIG. 1, there is shown a schematic illustration of a device in accordance with the invention for laying individual rigid pipe lengths. In this embodiment of the device for carrying out the process in accordance with the invention, the vibration generators are at least partially arranged within that portion of the device which is immersed in the soil during the operation. The main body of the device consists of a column-like structural member 2 which preferably has a rectangular cross section and may consist of several individual portions 4 connected to each other by flanges 6. In the interior of the main body 2, the pipes 8 to be laid end-to-end are stored horizontally in superimposed positions in a magazine. At the rear lower end, a discharge opening 10 is provided in the main body 2 through which the pipes to be laid are delivered to form a pipeline as the device is moved through the ground. The lower one of the portions 4 of the main body 2 may be extended, if desired, into the attachment 14 still to be described (please see the dotted line).

The soil engaging foot of the main body 2 has a closed attachment 14 placed in front of it in which there is arranged at least one vibration generator. The attachment 14 possesses an end face declined downwardly in the direction of advance, said end face being formed by a covering plate 16, with two or more vibrating bars 18 arranged at the covering plate 16 extending in parallel with each other in the direction of the inclination. The inclination of the covering plate is adapted to the respective kind of soil. Apart from this, the attachment 14 is completely closed by side-walls 20 and a bottom wall 22.

The vibration bars 18 are supported on the covering plate 16 by vibration-absorbing elements 24 arranged in spaced relation along the vibrating bars. Within the attachment 14, vibration generators 26 are arranged which are rigidly connected to the vibrating bars 18. In this arrangement, the connections between the vibration bars 18 and the vibration generators 26 are preferably displaced in a direction toward the one end of the vibration bars 18, whereby vibrating energy is distributed nonuniformly over the vibrating bars.

Vibrating surfaces 28 rigidly connected with at least one vibration generator are mounted on the side walls 20 of the attachment 14 by vibration absorbers. These lateral vibrating surfaces may preferably extend through a vibration path closed in itself, and their function generally is to reduce the side wall friction which occurs during the forward movement of the device. Preferably, the vibrating surfaces 30 are arranged on the portion 4 sliding through the soil, which surfaces 30 correspond to the vibrating surfaces 28 and have the same function and mode of operation as have the vibrating surfaces 28. Similarly, the attachment 14 may be provided with skirtings which are preferably excited to carry out vertical vibrations. By this, a deeper immersion through a soil consolidation with gritty soils or through a pulverizing decomposition in cohesive soils is favoured.

The tension rope 32 is fastened at the portion of the attachment 14 situated above the ground.

The sections A–B and C–D of FIGS. 1 and 2*a* show the manner of construction of the attachment, in particular the embodiment of the vibrating bars and the connection with the associated vibration generators. The attachment 14 comprises the lateral housing walls 20 as well as the covering plate 16. Welded to the sides of the covering plate 16 are rectangularly projecting side flanges 34 extending along the entire length of the covering plate 16 and accommodating between them the lateral housing walls 20. The side flanges 34 are provided with bores 36 through which a bolt 38 extends, serving to fasten the cover plate 16 to the attachment 14. The bolt 38 extends through a pipe 42 having its ends received in bores 40 provided in both housing walls 20 to which the pipe 42 is welded so that the bolt 38 is isolated with respect to the interior of the attachment. Suitable sealings 44 are provided between the flanges 34 and the housing walls 20.

The vibrating bars, two of which are provided in the embodiment given by way of example, i.e. the bars 46 and 48, are supported by vibration absorbers on the covering plate 16. Each of the bars 46 and 48 consists of an elongated U-profile provided with guides 50, 52 along their lateral edges. The front faces of the bars 46, 48 are advantageously provided with toothed bars 54 extending continuously over the entire length.

The vibration generators 26 which are effective on the vibrating bars, are situated within the attachment 14, that means preferably two generators are provided for each vibrating bar having eccentric masses rotating in opposite senses by which oriented vibrations are transmitted onto the bars vertically with respect to the end face of the vibrating bars. The base plate 56 of each vibration generator 26 is rigidly connected to a counterplate 60 by bolts 58, with a connection plate 62 clamped between the plates 56 and 60. This plate 62 extends through a slot 64 in the covering plate 16 and is rigidly connected with its associated vibrating bar 46 or 48, respectively. The slot 64 is sealed by suitable lip seals 66.

Each vibration generator 26 is supported by the housing of the attachment 14, in particular by a lateral housing wall 20. In this arrangement, vibration absorbers 68 are inserted between the vibration generators and the housing wall 20. The counter plate 60 is connected with the carrier plate 70 by vibration absorbers 68, said carrier plate 70 being fastened to the lateral housing wall 20 by bolts 72. Owing to this type of means for supporting the vibration generators 26, the vibrations are not transferred to the housing of the attachment 14 and the covering plate 16 may be removed together with the vibrating bars 46 and 48 by loosening the bolts 72 as well as the bolt 38, with no necessity of interrupting the connection between the vibration generators 26 and the connection plate 62.

Passages 74 are disposed within the attachment 14 which are provided with nozzles 76 which are spaced from each other and are terminating in this spaced arrangement in the chamber behind the vibrating bars 46 and 48. Fluid, in particular water but, if desired compressed air, too, is conveyed through these passages 74 and the nozzles 76, whereby freedom of movement is secured for the bars in the chamber behind the vibrating bars 46, 48.

FIG. 3 shows an embodiment of the device to carry out the process in accordance with the invention, which differs from that just described. In this embodiment, the front side of the upright main body 102 has placed before it, and covering approximately the total lentgh of said main body 102, a structural member 104 adapted to vibrate and supported at the main body by vibration-absorbing elements 106. In this embodiment the vibration generator(s) is/are arranged on a base plate 108 provided at the upper end of the vibrating structural member 104 for this purpose. The vibrating structural member 104 may be designed in such a manner that it laterally projects over the main body 102 at least at the front portion thereof. The lower portion of the attachment 104 is preferably elongated to the rear so that a triangular extension 110 is formed.

On the side walls of the main body 102, vibrating surfaces 112 are provided for overcoming the side wall friction, said vibrating surface being supported by vibration-absorbing elements 114 rigidly connected with the vibration generators 116 arranged within the main body.

With the embodiment shown by way of example, the main body 102 is provided with a line guide channel 118 extending at first vertically from above and then passing over into the horizontal direction. Thus, this apparatus is designed to lay an endless flexible line or cable. Principally, however, the main body 102 may be designed in accordance with the embodiment in FIG. 1 to lay individual rigid pipes.

If the process in accordance with the invention is to be combined with the conventional washing process, the lower parts of the main body 102 must be provided with nozzles, which are fed from the high pressure channel arranged within the main body 102 in the front area thereof. These nozzles are advantageously inclined at an angle of about 45° toward the horizontal which is indicated by the dash-dotted lines 120. The attachment 104 is to be provided with recesses (not shown) at the portions lying within the zones of the nozzles.

FIG. 4 shows the arrangement of the vibrating surfaces 112 laterally of the main body 102. These vibrating surfaces are supported on the side walls of the main body 102 by vibration absorbers 122. A rigid transverse beam 126 connected with either end to one of the vibrating surfaces 112 extends through two bores 124 aligned with each other and sealed by corresponding gaskets. Oscillation generators 116 which are preferably working in opposed senses, are rigidly arranged on the beam 126.

The lower housing plate 128 of the main body 102 is detachably fastened to the side walls of the housing in the manner of a mounting plate. The lower edges of the side walls each have fastened thereto a cornice 130 excluding admittance to the intermediate space between the lateral housing walls and the vibrating plates. A corresponding closure of this space in a direction towards the front side of the apparatus is formed by the attachment 104 laterally projecting over the main body 102.

In general, the main body 102 shown in FIG. 3 as well as the attachment 104 may be increased in length to any desired height by corresponding structural members to be superimposed thereon. In FIGS. 5–7, another embodiment of the apparatus in accordance with the invention will be seen in which a main body having relatively small dimensions has placed in front thereof merely an attachment designed in the manner of an angle iron which carries at its upper end the vibration generator or generators 201. The main body 202 is again composed of various individual portions 204 and, in the embodiment shown, is intended to be used for laying a flexible cable or line, respectively. As will be seen in FIG. 6, the attachment 206 is adapted with respect to its width to the width of the main body 202. The attachment may be extended by fixtures 207 corresponding to the portions 204, for instance, in the form of simple tubes. The attachment 206 is connected to the clamping members 210 by vibration absorbers 208 which are detachably fastened to the front portion of the main body 202 by bolts 212. At the ends of the legs of the angular attachment 206, extensions 214 are fixed which block admittance to the space in rear of the attachment leaving only a narrow open gap.

For combining the method in accordance with the invention with the conventional washing method, the front portion of the main body 202 is designed as a high pressure passage. The individual nozzles 216 extend from this passage inclined upwardly at an angle of about 45° toward the vertical plane, wherein the attachment 206 is provided with recesses 218 situated in the areas lying within the direction of the nozzles.

The nozzles 216 each comprise a nozzle bushing 217 rigidly welded into the front wall of the main body 202 into which the nozzle 219 itself is inserted capable of being replaced.

With the embodiments shown in FIGURES 3 through 7, the vibration generator, or the vibration generators, of the vibration attachment arranged in front of the end face of the main body is/are arranged on the top end of the attachment. Generally, the vibration generators mounted in this manner, are provided to generate vertically directed vibrations. It is, however, possible as well by supporting the attachment in a special manner on the main body, to deflect the vertically oriented vibrations so generated, at least partially, in the horizontal direction. Such a support is shown by way of example in FIG. 10. This figure shows a vibration absorber 230 arranged between the attachment 104 or 206 and the main body 102 or 202, respectively. The vibration absorber 230 engages the attachment 104 or 206 at surface 232 and the main body 102 or 202 on inclined surface 234. As surfaces 232 and 234 are obliquely disposed to the vertical, the forces exerted on the elements 230 by the vertically directed vibrations are partially absorbed by the main body in such a manner that horizontally directed reaction forces are generated on the attachment.

In this arrangement of the vibration absorber in the form of deflecting buffers it should be noted that reaction forces are transferred to the main body as well, at least in cases in which the attachment possesses a mass comparable to that of the main body. In such cases, the guiding means for the material to be laid must be supported isolated from vibrations in the main body.

FIG. 9 shows a seal for the rearward discharge opening of the guide channel for a pipe to be laid by which the entrance of soil into the guide channel is prevented. The seal in addition, forms a vibration absorber for the pipes to be discharged, and consists of a plurality of individual sealing rings clamped between hard packing plates 240. The seal rings 242 preferably consist of an elastomeric material. The seal is arranged at one end of the housing 244 of the chamber which forms the terminal of the line guide channel 248 in the main body 250 shown in FIG. 8. For adaptation to the various diameters of the lines to be laid, it is possible to attach to the rear guide of the channel 248 a plurality of seal chambers provided with seal rings 242 of differing inner diameters.

FIGS. 11 and 12 diagrammatically represent various ways of utilizing the process and the device in accordance with the invention. In accordance with FIG. 11, the pipe laying apparatus 290 is adapted to be mounted behind an automotive vehicle 292 and may thus be moved over passable, loose soil to lay pipe 294. When laying a line 296 in swampy grounds, preferably a sliding carriage 252 is used (please see FIG. 12) on which the laying apparatus 298 is mounted by interpositioning a vibration-absorbing device 254. The vibration absorbing device 254 is intended to prevent the sliding carriage 252 from vibrating which would cause it to be pressed into the soil. In the embodiments given by way of example in FIGS. 11 and 12, the vibration generators 256 are arranged at the top end of the forward members of the laying apparatus 290 and 298.

FIG. 13 is a schematic view of an embodiment serving to lay individual pipe sections in which, contrary to the arrangement in accordance with FIGS. 1 and 2, the vibration generators 258 are likewise arranged at the top end of the attachment 260. The attachment 260 projects over the main body 262 at the lower end thereof on both sides with triangular projections 264. The attachment 260 is supported along its front portion by vibration absorbers 266 which are engaging the front side of the main body 262, while the two projections 264, as will be seen from FIG. 13*a*, are supported on the main body by laterally arranged vibration absorbing elements 268.

FIG. 14 is only a schematic view of an embodiment in which an attachment 272 placed in front of the lower portion of the main body 270 which is also immersing into the soil, is provided with vibration generators 274 disposed below the soil, said vibration generators vibrating the entire attachment 272.

From the above explanations it will be clearly seen that the apparatuses for carrying out the process in accordance with the invention may be designed in many ways. In particular, the invention may be embodied also by providing a cable-laying apparatus as has been used so far for the conventional washing process with a vibration generator arranged at the head thereof, wherein care will only have to be taken that the material to be laid with the apparatus is protected against vibrations.

Special stress must be laid to the fact that, to adapt the apparatus of the invention to the various diameters of the lines to be laid or the bending radii, respectively, depending on the diameters several pipe or cable guide channels with the necessary bending radii are provided which may be screwed to the main body as required. It is also possible to attach to the main body a line guide channel which may accommodate several lines, thus laying several lines or cables simultaneously in one operation. In this case, the pipe channel is sub-divided into several guide channels by webs.

What I claim is:

1. The device for embedding an elongated member underground comprising, in combination, an upright column-like hollow structure having a lower end and a front portion and lateral sides, guide means for said elongated member defined within said hollow structure, outlet means for said elongated member defined adjacent said lower end of said hollow structure and directed rearwardly thereof, a first vibrating soil engaging body mounted in front of said front portion of said hollow structure and mounted thereto, vibration-absorbing elements mounting said body to said hollow structure, a first vibration generator operatively connected to said first vibrating body, second soil engaging vibrating bodies defined on both lateral sides of said hollow structure and mounted thereto, vibration-absorbing elements mounting said second bodies to said lateral sides, a second vibration generator arranged within said hollow structure, means for operatively connecting said second vibration generator to said second vibrating bodies, said connecting means extending through openings defined in said lateral sides of said hollow structure, and sealing means arranged between the walls of said openings and said connecting means, said sealing means being in the form of vibration-absorbing means.

2. The device for embedding an elongated member underground comprising, in combination, an upright column-like hollow structure having a front, an internal front portion and a lower end, guide means for said elongated member defined within said hollow structure, outlet means for said elongated member defined adjacent the lower end of said hollow structure and directed rearwardly thereof, at least one vibrating soil engaging body mounted in front of said hollow structure, vibration-absorbing elements mounting said body to said hollow structure, at least one vibration generator operatively connected to said vibrating body, a high pressure fluid duct defined in the internal front portion of said hollow structure adjacent said vibrating soil engaging body, nozzle means inclined upwardly mounted on said hollow structure in communication with said high pressure fluid duct in relative vertically spaced relation over the length of said vibrating body and apertures defined in said vibrating body coaxially aligned with said nozzle means.

3. The device as claimed in claim 2, wherein said vibrating soil engaging body is formed by an angular profile having an upper end and legs defining an apex, said body being arranged with its apex directed forwardly, the maximum distance between the ends of said legs corresponding substantially to the width of said hollow structure, said vibration generator being mounted on the upper end of said angular profile.

4. The device for embedding an elongated member underground comprising, in combination, an upright column-like hollow structure having a front, an internal front portion, lateral sides and a lower end, guide means for said elongated member defined within said hollow structure, outlet means for said elongated member defined adjacent the lower end of said hollow structure and directed rearwardly thereof, a first vibrating soil engaging body mounted in front of said hollow structure front, vibration-absorbing elements mounting said body upon said hollow structure, a first vibration generator operatively connected to said first vibrating body, second soil engaging vibrating bodies, vibration-absorbing means mounting said second bodies on said lateral sides of said hollow structure, a second vibration generator mounted within said hollow structure, means for operatively connecting said second vibration generator to said second vibrating bodies, said connecting means extending through openings defined in the lateral sides of said hollow structure, sealing means defined between the walls of said openings and said connecting means, said sealing means being in the form of vibration-absorbing means, a high pressure fluid duct defined in said internal front portion of said hollow structure adjacent said first vibrating soil engaging body, a plurality of nozzle means inclined upwardly mounted upon said hollow structure communicating with said high pressure fluid duct and in relative spaced relation to each other over the length of said first vibrating body, and apertures defined in said first vibrating body coaxially aligned with said nozzle means.

5. The device as claimed in claim 2, in which said first vibrating soil engaging body is formed by an angular profile having an upper end and an apex directed forwardly with respect to said hollow structure, the width of said profile corresponding substantially to the width of said hollow structure, said vibration generator being mounted upon said upper end of said angular profile.

6. The method of embedding an elongated member underground by means of a laying device excavating a ditch into which said elongated member is to be embedded, said method comprising the steps of placing the laying device into the ground to a depth corresponding to the required depth for laying said elongated member, engaging the soil at least ahead of the laying device with a forwardly disposed surface of the laying device, vibrating said surface of said laying device against the engaging soil with sufficient frequency to displace the engaged soil and reduce the force necessary to move the laying device through the ground, the vibrating movement of said surface having a forwardly directed component, further vibrating the soil engaging lateral surfaces of the laying device rearwardly of the forwardly disposed surface of the laying device, and simultaneously moving the laying device along the desired direction of the ditch, isolating a rearward portion of the laying device from the vibration imposed on the laying device surfaces, and feeding said elongated member rearwardly out of the laying device isolated portion into said ditch while the laying device is advanced.

7. The method of embedding an elongated member underground by means of a laying device excavating a ditch into which said elongated member is to be embeded, said method comprising the steps of placing the laying device into the soil to a depth corresponding to the required depth for laying said elongated member, engaging the soil throughout the depth of the laying device at least ahead of the laying device with a forwardly disposed surface of the laying device, simultaneously vibrating said surface of the laying device against the engaging soil with sufficient frequency to displace the engaged soil and reduce the force necessary to move the laying device through the ground in a direction having components of movement in a forward and upward direction and engaging the engaged and displaced soil with jets of high pressure fluid directed forwardly and upwardly, further vibrating the soil engaging lateral surfaces of the laying device rearwardly of the forwardly disposed surface of the laying device, and simultaneously moving the laying device along the desired direction of the ditch and feeding said elongated member rearwardly from the laying device into said ditch while the laying device is advanced.

References Cited by the Examiner

UNITED STATES PATENTS

| | | | |
|---|---|---|---|
| 333,114 | 12/1885 | Dougine | 61—72.5 |
| 2,664,794 | 1/1954 | Evans | 94—46 |
| 2,850,815 | 9/1958 | Edwards | 37—141 |
| 2,949,871 | 8/1960 | Finn | 172—40 X |

FOREIGN PATENTS

| | | |
|---|---|---|
| 629,544 | 5/1936 | Germany. |
| 900,959 | 1/1954 | Germany. |
| 1,110,575 | 7/1961 | Germany. |
| 2,219 | 1/1914 | Great Britain. |
| 149,003 | 10/1921 | Great Britain. |

EARL J. WITMER, *Primary Examiner.*

JACOB L. NACKENOFF, *Examiner.*

T. W. FLYNN, *Assistant Examiner.*